United States Patent [19]

Heinrich

[11] Patent Number: 4,773,998
[45] Date of Patent: Sep. 27, 1988

[54] WATER FILTER

[76] Inventor: Elmer G. Heinrich, 12215 E. Skelly Dr., Tulsa, Okla. 74128

[21] Appl. No.: 26,629

[22] Filed: Mar. 17, 1987

[51] Int. Cl.⁴ .................. B01D 23/10; B01D 23/20
[52] U.S. Cl. .................... 210/288; 210/289; 210/291; 210/279
[58] Field of Search .............. 210/279, 288, 315, 316, 210/317, 461, 500.1, 503, 275, 287, 289, 291, 292, 486, 266

[56] References Cited

U.S. PATENT DOCUMENTS

| | | | |
|---|---|---|---|
| 938,778 | 11/1909 | Morrison | 210/486 |
| 2,302,240 | 11/1942 | Michaud | 210/288 |
| 3,544,457 | 12/1970 | Tulley et al. | 210/500.1 |
| 4,098,695 | 7/1978 | Novotny | 210/279 |
| 4,301,009 | 11/1981 | Cook et al. | 210/288 |
| 4,362,618 | 12/1982 | Cook et al. | 210/275 |
| 4,379,750 | 4/1983 | Tiggelbeck | 210/291 |
| 4,515,692 | 5/1985 | Chandler et al. | 210/288 |

FOREIGN PATENT DOCUMENTS

| | | | |
|---|---|---|---|
| 982737 | 12/1982 | U.S.S.R. | 210/503 |
| 18234 | of 1915 | United Kingdom | 210/486 |

Primary Examiner—Ernest G. Therkorn
Assistant Examiner—Linda S. Evans
Attorney, Agent, or Firm—Head & Johnson

[57] ABSTRACT

A water filter formed of an upright closed vessel having water inlet and outlet openings adjacent the top thereof, an outlet pipe extending within the vessel from the water outlet opening to adjacent the vessel interior bottom, a permeable barrier filter positioned within the vessel adjacent the interior bottom and affixed to the lower end of the outlet pipe, the vessel being filled with a particulate filter medium, preferably charcoal or the equivalent, the filter medium surrounding the barrier filter, and the barrier filter being formed by a short length tubular wall of impervious material having an opening in the tubular wall, a filter inlet pipe received in the opening in the tubular wall and extending within the housing, the end of the filter inlet pipe within the housing being closed and the pipe having a plurality of small openings therein, two semi-circular permeable foam plastic filter members within the interior of the housing, the semi-circular filter members being the thickness substantially that of the length of the housing side of the filter inlet pipe within the housing, cloth membranes covering the ends of the tubular wall, and the filter inlet pipe being connected outside the tubular wall to the outlet pipe.

6 Claims, 2 Drawing Sheets

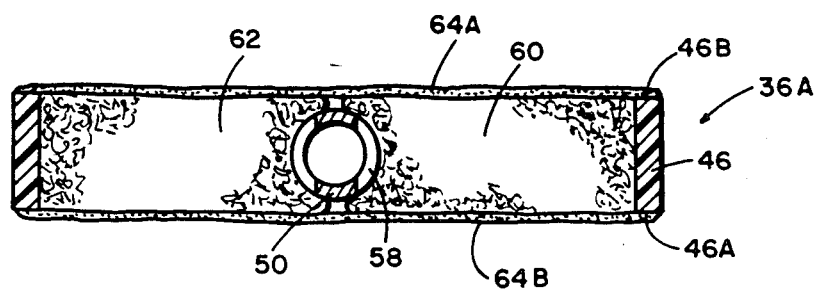
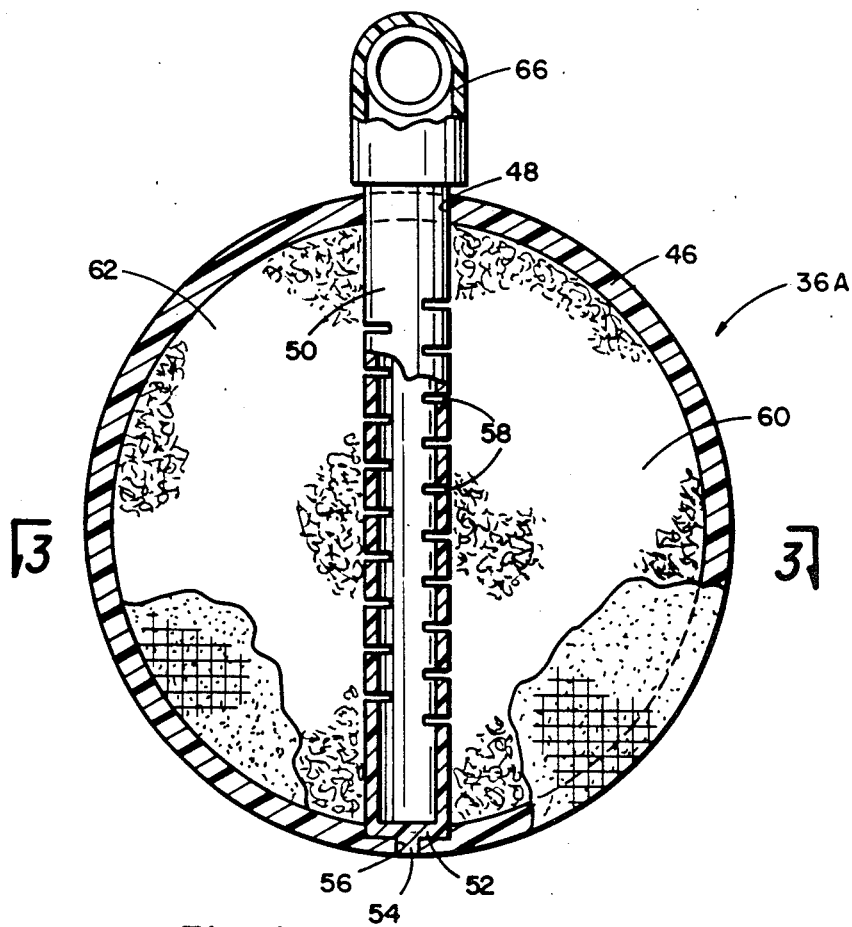

WATER FILTER

SUMMARY OF THE INVENTION

There are many applications for water filters including large industrial filtration systems employed by municipalities. The present invention however, is directed towards a water filter of the type adapted for home, office or industry application wherein it is desired to provide a final water filter to remove particulate matter before the water is used for drinking or other purposes. The water filter of this invention provides for the use of a particulate filter medium which serves not only to aid in removing suspended solids, but also serves to purify the water by neutralization of its chlorine content.

The filter of this invention is in the form of an upright vessel having a closed top and bottom end and a cylindrical side wall. Adjacent the top of the vessel is a water inlet opening and a water outlet opening. Connected to the water inlet opening is a short length water distribution pipe which is closed at its end within the vessel and has a plurality of small openings so that water passing through the inlet pipe is distributed into the interior of the vessel. Connected to the outlet opening is a water outlet pipe which extends downwardly to adjacent the lower interior end of the vessel. Within the lower end of the vessel is a permeable barrier filter connected to the lower end of the water outlet pipe. The interior of the vessel is filled with a particulate filter medium, preferably charcoal or its equivalent, so that the particulate filter medium completely surrounds the barrier filter.

Water flows into the vessel through the inlet pipe extending through the inlet opening and enters the top of the vessel where the water flows downwardly through the particulate filter medium towards the interior bottom of the vessel. In the lower portion of the vessel the water flows into the permeable barrier filter and from thence into the lower end of the water outlet pipe. The water flows through the water outlet pipe and through the vessel outlet opening. In this flow path the water is filtered first by the particulate filter medium where, when the filter medium is chemically active, such as if of charcoal, the water is also treated. Subsequently the water is filtered by the barriers filter so that the water passing out is free of suspended solids and is treated in accordance with the type of particulate filter medium employed.

The permeable barrier filter is preferably of the type formed of a housing in the shape of a short length tubular wall formed of impervious material open at both ends, such as a short length of relatively large diameter pipe. An opening is formed in the tubular wall. A pipe is sealably received in the opening in the tubular wall and extends within the housing. When the housing is circular the pipe preferably extends in the plane of an internal diameter of the housing. The pipe is closed at its end within the housing and has a plurality of small openings therein communicating the interior of the pipe with the interior of the housing.

Permeable foam plastic substantially fills the interior of the housing on both sides of the pipe. Permeable cloth membranes are affixed to the opposed ends of the housing, completely closing the housing to the flow of fluid therein except through such membranes. Water flowing through the membranes flows through the permeable foam plastic within the housing and into the interior of the pipe then through the small openings in the pipe and out of the housing through the pipe which in turn is connected to the water outlet pipe within filter vessel.

A more complete understanding of the invention will be had with reference to the following description and claims taken in conjunction with the attached drawings.

DESCRIPTION OF THE DRAWINGS

FIG. 2 is a cross-sectional view taken along the line 2—2 of FIG. 1 showing the internal construction of a permeable barrier inlet filter used within the filter vessel.

FIG. 3 is a cross-sectional view taken along the line 3—3 of FIG. 2 showing more details of the permeable barrier inlet filter.

DETAILED DESCRIPTION OF THE DRAWINGS

Figure 1:
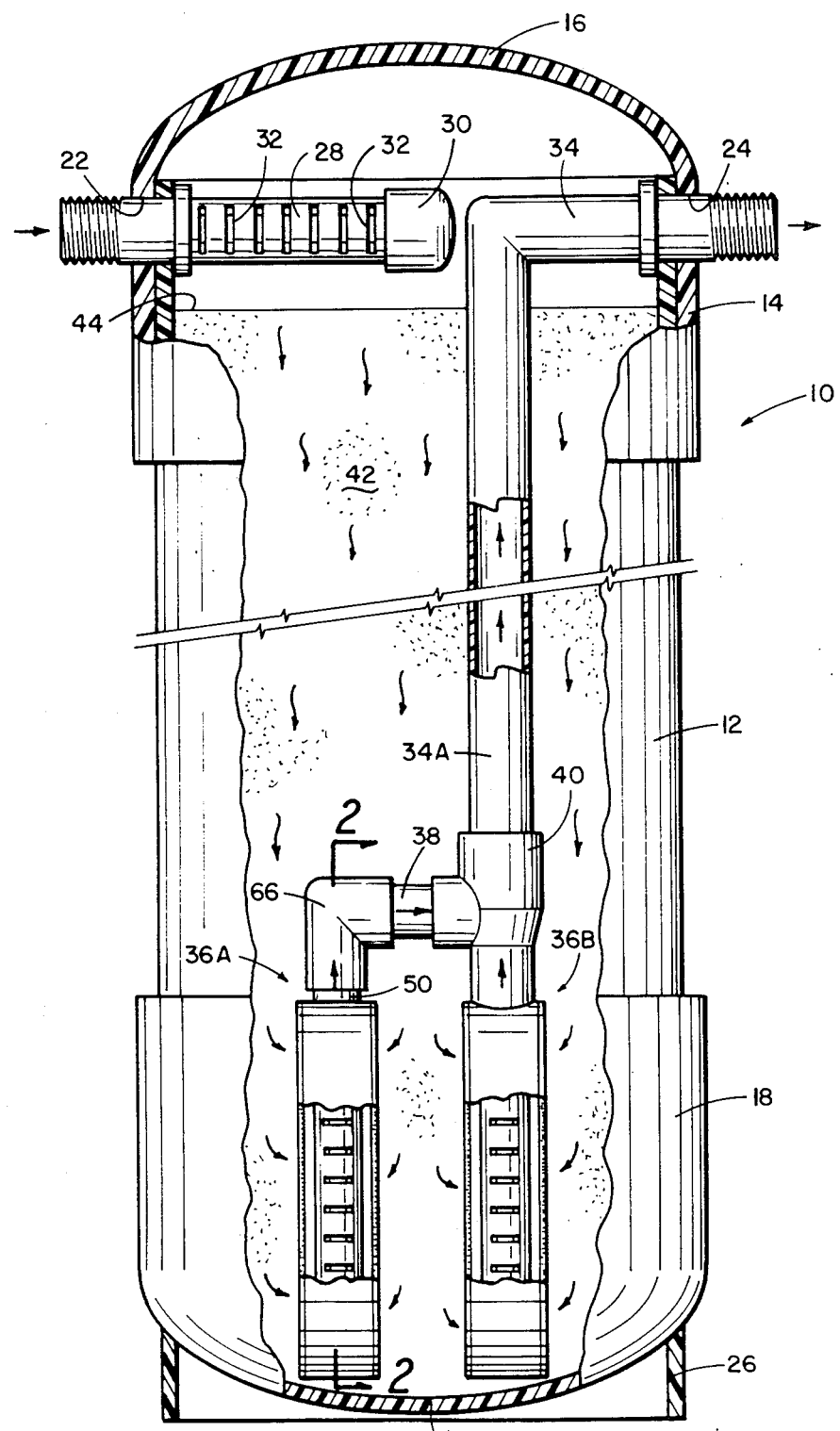
FIG. 1 is an external elevational view of a water filter embodying the principles of this invention, shown cut away to reveal the interior arrangement thereof. Some of the interior components are also cut away to reveal details as to their construction.

Referring to the drawings, and first to FIG. 1, a water filter incorporating the principles of this invention is generally indicated by the numeral 10. The filter includes a vessel formed of a vertical tubular sidewall portion 12, and an upper bell closure 14 providing a vessel top 16. The bottom of housing 12 is, in like manner, closed by a bell closure 18 forming a vessel bottom 20. A water inlet opening 22 and an outlet opening 24 is formed in the vessel adjacent the top. A short length large diameter tubular member 26 is affixed to the bottom bell closure 18 and supports the water filter when it is sitting on a flat surface.

Sealably extending through the inlet opening 22 is a short length water inlet distribution pipe 28, closed with an end cap 30 and having a plurality of small openings 32 therein.

Extending through the outlet opening 24 is a water outlet pipe 34 with a downwardly extending portion 34A. At the lower end of the water outlet pipe 34A there are two permeable barrier inlet filters generally indicated by the numeral 36A and 36B. Inlet filter 36B is connected directly to the lower end of water outlet pipe 34A whereas inlet filter 36A is connected by a pipe 38 to a T-fitting 40 which in turn is connected to the lower end of the water outlet pipe 34A.

The interior of the vessel 10 is substantially filled with a particulate filter medium 42, such as charcoal. While the entire interior may be filled with such particulate matter the level should be at least to the level 44 which is just below the distribution pipe 28.

Water flowing into the filter 10 passes out the openings 32 in the distribution pipe 28 into the interior of the vessel. The water migrates downwardly as indicated by the arrows through the particulate filter medium 42. In the lower end of the vessel water passes through the permeable barrier inlet filters 36A and 36B and into the lower end of water outlet pipe 34A. From thence the water flows out through the outlet pipe 34. While two inlet filters 36A and 36B are shown as examples in FIG. 1 it can be seen that according to the size of the vessel one, two or more of such inlet filters may be employed. For a better understanding of the inlet filters reference may be had, in addition to FIG. 1, to the cross-sectional views of FIGS. 2 and 3.

Each of the inlet filters includes a housing formed by a short length tubular wall 46 made of impervious material. One practical way of constructing the housing wall 46 is by cutting short lengths of relatively large diameter plastic pipe. While wall 46 is shown to be circular (as formed from short lengths of large diameter pipes) it can be seen that the circular shape is not critical and the wall 46 may be square or of other cross-sectional shape if desired.

Formed in the tubular wall is an outlet opening 48 and sealably received within opening 48 is a pipe 50. When the wall 46 is circular, as shown, pipe 50 preferably extends as an internal diameter of the housing wall. The lower end of the pipe 50 is closed at 52. The closed end has an integral extending portion 54 of reduced diameter which is received in a small diameter recess 56 in the interior of wall 46 serving to anchor the end pipe 50. As an alternative arrangement it can be seen that the end of 52 may be closed in any other way, such as by the use of a typical end cap. The wall 46 and the pipe 50 are preferably formed of plastic. A plurality of small openings 58 are formed in the pipe 50.

Positioned within the interior of tubular wall 46, to the opposite sides of pipe 50, are permeable foam plastic members 60 and 62, the foam plastic members being generally of semicircular shape and of thickness substantially that of the length of wall 46. The foam plastic members 60 and 62 are formed of permeable material so that water can flow therethrough and migrate to the openings 58 in pipe 50.

The short length tubular wall 46 provides open ends 46A and 46B (see FIG. 3). These open ends are closed by permeable cloth membranes 64A and 64B which are sealed to the wall ends of 46A and 46B. The cloth membranes 64A and 64B are preferably of plastic mat material which freely passes water therethrough but which intercepts solid matter suspended in the water.

Inlet filter 36A is connected by an L-fitting 66, which in turn connects with pipe 38 extending to the T-fitting 40.

The permeable barrier inlet filter of the type illustrated in FIGS. 2 and 3 forms a highly effective method of collecting water which has passed downwardly through the particulate filter medium 42 in vessel 10, and as has been previously mentioned, one, two, three or more of such permeable barrier inlet filters may be employed.

The invention thus described provides a highly effective water filter for removing solid matter suspended in water and, by the use of appropriate particulate filter medium 42, provides means of treating the water passing through the filter. The filter is particularly adaptable to back flushing, that is where the direction of flow of water is reversed. Reversed fluid flow removes solid matter which accumulates on the outer surface of the cloth membranes 64A and 64B of each of the inlet filters and to flush such suspended solid material back out the inlet pipe 28. By periodic back flushing the effective life of the filter can be greatly increased.

One distinction in the filter herein described is that the filters 36 are only at one end of the filter housing rather than in a filter at both ends as is customary in the industry. This prevents muck and other contaminants from being trapped between filters and augments successful back flushing.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A water filter comprising:

an upright closed vessel having a top, bottom and sidewalls and having means defining a water inlet opening adjacent the top thereof and means defining a water outlet opening;

a water outlet pipe extending within said vessel from said water outlet opening to adjacent said vessel interior bottom;

a permeable barrier inlet filter positioned within said vessel adjacent the interior bottom thereof and being affixed with internal communication to the lower end of said water outlet pipe, the inlet filter having a housing formed by a short length tubular wall of impervious material open at each end and having means defining an opening in the tubular wall;

a filter inlet pipe sealably received in said opening in said tubular wall and extending within said housing, the end of the filter inlet pipe within said housing being closed and the pipe having means defining a plurality of small openings therein communicating the interior of the pipe with the interior of said housing;

two semi-circular permeable foam plastic filter members within the interior of said housing, the semi-circular filter members being of thickness substantially that of the length of said housing and being positioned one to either side of said filter inlet pipe within said housing;

permeable cloth membranes closing said ends of said housing, whereby water can flow through said membranes into the interior of said housing and through said permeable foam plastic filter members into said pipe through said small openings therein and out of said housing through said pipe, said pipe being connected, outside of said housing, the said water outlet pipe; and a particulate filter medium substantially filling the interior of said vessel and surrounding said barrier filter.

2. A water filter according to claim 1 wherein said particulate filter medium is of the type which also purifies water flowing therethrough.

3. A water filter according to claim 2 wherein said particulate filter medium is charcoal.

4. A water filter according to claim 1 including:

a short length inlet pipe within said vessel connected to said water inlet opening, the inlet pipe being closed at the end within said vessel and having a plurality of small openings therein, the water inlet pipe serving to improve distribution of inflowing water into the interior of said vessel.

5. A water filter according to claim 1 including a plurality of said permeable barrier filters separately positioned within said vessel adjacent the interior bottom thereof and being each connected in parallel flow path arrangement with said water outlet pipe.

6. A water filter according to claim 1 including a plurality of said permeable barrier inlet filters separately positioned within said vessel adjacent the interior bottom thereof and wherein said receiving pipe of each said permeable barrier inlet filter is connected, to said water outlet pipe, whereby said plurality of permeable barrier inlet filters are in parallel flow path arrangement feeding said water pipe.

* * * * *